United States Patent
Iwata

(10) Patent No.: US 11,106,119 B2
(45) Date of Patent: Aug. 31, 2021

(54) PROJECTION APPARATUS THAT PROJECTS IMAGE USING LASER BEAMS, CONTROL METHOD OF THE SAME, AND STORAGE MEDIUM

(71) Applicant: CANON KABUSHIKI KAISHA, Tokyo (JP)

(72) Inventor: Takuya Iwata, London (GB)

(73) Assignee: CANON KABUSHIKI KAISHA, Tokyo (JP)

(*) Notice: Subject to any disclaimer, the term of this patent is extended or adjusted under 35 U.S.C. 154(b) by 13 days.

(21) Appl. No.: 16/525,740

(22) Filed: Jul. 30, 2019

(65) Prior Publication Data

US 2020/0041888 A1 Feb. 6, 2020

(30) Foreign Application Priority Data

Aug. 2, 2018 (JP) .............................. JP2018-146199

(51) Int. Cl.
G03B 21/20 (2006.01)
G03B 21/14 (2006.01)
H04N 1/00 (2006.01)

(52) U.S. Cl.
CPC ....... *G03B 21/2033* (2013.01); *G03B 21/142* (2013.01); *G03B 21/206* (2013.01); *G03B 21/2053* (2013.01); *H04N 1/00681* (2013.01); *H04N 2201/0438* (2013.01)

(58) Field of Classification Search
CPC .............. G03B 21/2033; G03B 21/142; G03B 21/2053; G03B 21/206; H04N 1/00681; H04N 2201/0438
See application file for complete search history.

(56) References Cited

U.S. PATENT DOCUMENTS

2009/0147224 A1* 6/2009 Kurozuka ............ H04N 9/3129
353/98
2013/0127717 A1* 5/2013 Nagashima ........... G06F 3/0488
345/158

(Continued)

FOREIGN PATENT DOCUMENTS

JP 2011-186188 A 9/2011
JP 2012-032464 A 2/2012

(Continued)

*Primary Examiner* — Michelle M Iacoletti
*Assistant Examiner* — Magda Cruz
(74) *Attorney, Agent, or Firm* — Cowan, Liebowitz & Latman, P.C.

(57) ABSTRACT

A projection apparatus comprises: a first laser beam source configured to output a visible laser beam; a second laser beam source configured to output an invisible laser beam; a scan unit configured to project an image by scanning a projection surface using the visible laser beam output from the first laser beam source and the invisible laser beam output from the second laser beam source; and a control unit configured to control a timing at which the first laser beam source outputs the visible laser beam and a timing at which the second laser beam source outputs the invisible laser beam so that, in a period corresponding to a target pixel in the image, the visible laser beam is output in a first period and the invisible laser beam is output in a second period different from the first period.

21 Claims, 11 Drawing Sheets

(56) References Cited

U.S. PATENT DOCUMENTS

| | | | | |
|---|---|---|---|---|
| 2014/0176505 A1* | 6/2014 | Arai | ............... | G06F 3/0418 |
| | | | | 345/175 |
| 2016/0247431 A1* | 8/2016 | Chikaoka | ............... | G09G 3/02 |
| 2018/0288366 A1* | 10/2018 | Adler | ............... | G02B 26/105 |
| 2019/0094665 A1* | 3/2019 | Sowa | ............... | G03B 21/2033 |

FOREIGN PATENT DOCUMENTS

| | | | | | |
|---|---|---|---|---|---|
| JP | 2014119937 A | * | 6/2014 | ......... | G06F 3/0346 |
| JP | 2020-187165 A | * | 11/2020 | ......... | G03B 21/00 |

* cited by examiner

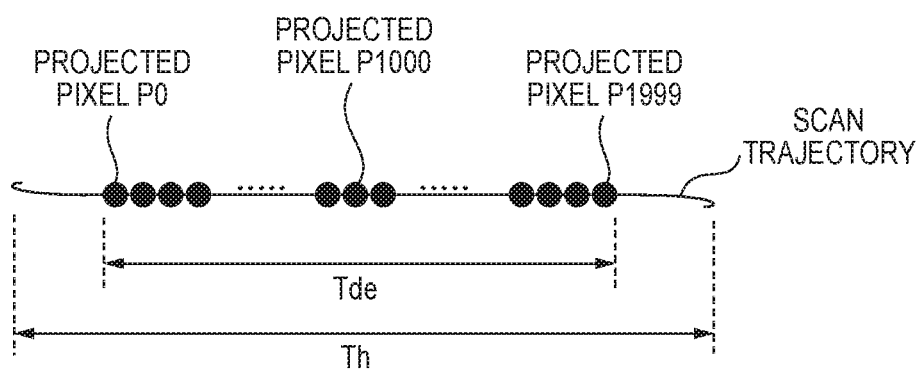
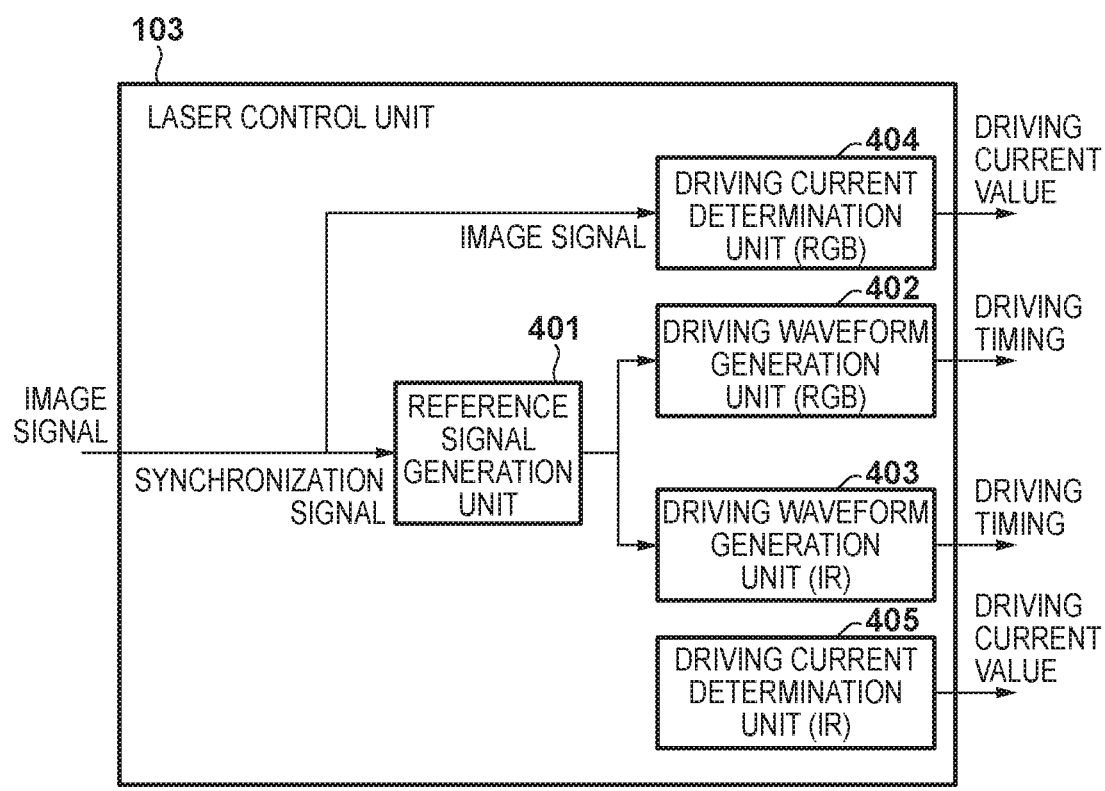

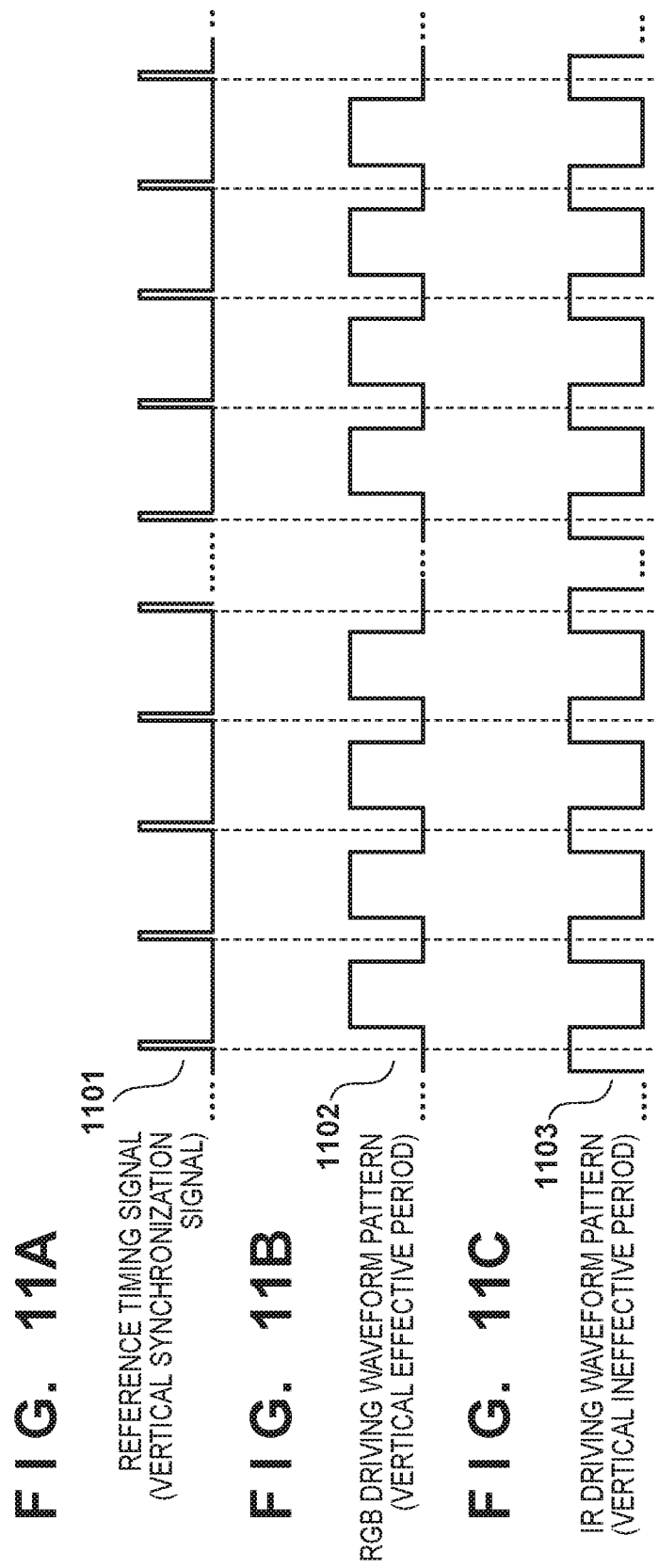

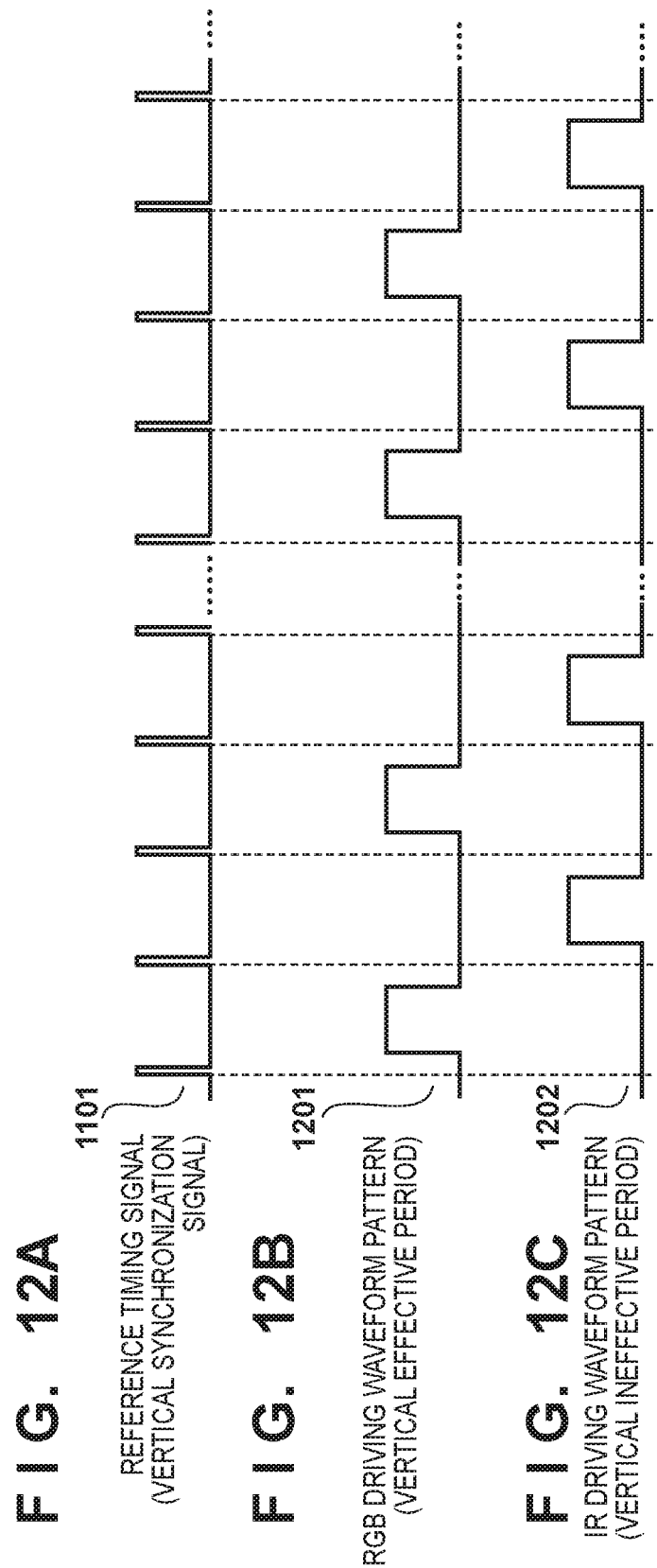

PROJECTION APPARATUS THAT PROJECTS IMAGE USING LASER BEAMS, CONTROL METHOD OF THE SAME, AND STORAGE MEDIUM

BACKGROUND OF THE INVENTION

Field of the Invention

The present invention relates to a projection apparatus that projects an image using laser beams, a control method of the same, and a storage medium.

Description of the Related Art

There is a known projection apparatus (projector) that uses a beam source that emits beam-like light, which is a light beam having excellent straightness and light-collecting properties as represented by a laser beam (hereinafter simply referred to as a laser beam for the sake of brevity). A projector disclosed in Japanese Patent Laid-Open No. 2012-32464 can not only project an image onto a projection surface by causing a plurality of visible laser beams having colors and brightness corresponding to pixel values to perform two-dimensional scanning on the projection surface, but also project an invisible (e.g., infrared) laser beam. The projector disclosed in Japanese Patent Laid-Open No. 2012-32464 can detect a distance to the projection surface and detect the position of a detection target object on the projection surface by detecting the invisible laser beam reflected by the projection surface.

Also, in projection of an image onto a projection surface using laser beams emitted from a plurality of beam sources, it is necessary to control the emission directions and emission timings of the laser beams. Japanese Patent Laid-Open No. 2011-186188 discloses a technique in which, on an image display apparatus that causes a beam source array including beam source elements arrayed in correspondence with a first direction of a display surface to scan in a second direction of the display surface, congestion noise is reduced by shifting a driving timing for each beam source element or for each group of beam source elements.

Incidentally, an apparatus that emits a laser beam needs to output the laser beam at an output value that satisfies predetermined conditions set by safety regulations. In outputting a plurality of laser beams, or in outputting a visible laser beam and an invisible laser beam, a total output representing a sum of outputs of the respective laser beams needs to satisfy the safety regulations.

With the technique disclosed in Japanese Patent Laid-Open No. 2012-32464, as the visible laser beams and the invisible laser beam are emitted in synchronization, it is necessary to reduce the maximum output of the visible laser beams compared to a case where the invisible laser beam is not used. That is, the maximum luminance of a projected image is lowered.

The technique disclosed in Japanese Patent Laid-Open No. 2011-186188 does not take in consideration the driving timings of the beam sources for a case where visible laser beam sources and invisible laser beam sources are provided. If the driving timing is simply shifted for each of the red, green, and blue laser beams and the infrared laser beam as in the technique disclosed in Japanese Patent Laid-Open No. 2011-186188, the projection positions of red pixels, blue pixels, and green pixels do not match. That is, an inter-color shift (misregistration) occurs, thereby causing deterioration in the image quality of a projected image.

SUMMARY OF THE INVENTION

The present disclosure has been made in consideration of the aforementioned issues, and realizes a technique that can suppress a reduction in the luminance of a projected image while suppressing a reduction in the image quality caused by misregistration with respect to an apparatus that projects an image using laser beams.

In order to solve the aforementioned problems, one aspect of the present disclosure provides a projection apparatus comprising: a first laser beam source configured to output a visible laser beam; a second laser beam source configured to output an invisible laser beam; a scan unit configured to project an image by scanning a projection surface using the visible laser beam output from the first laser beam source and the invisible laser beam output from the second laser beam source; and a control unit configured to control a timing at which the first laser beam source outputs the visible laser beam and a timing at which the second laser beam source outputs the invisible laser beam so that, in a period corresponding to a target pixel in the image, the visible laser beam is output in a first period and the invisible laser beam is output in a second period different from the first period.

Another aspect of the present disclosure provides a control method of a projection apparatus which includes a first laser beam source configured to output a visible laser beam, a second laser beam source configured to output an invisible laser beam, and a scan unit configured to project an image by scanning a projection surface using the visible laser beam output from the first laser beam source and the invisible laser beam output from the second laser beam source, the method comprising: controlling a timing at which the first laser beam source outputs the visible laser beam and a timing at which the second laser beam source outputs the invisible laser beam so that, in a period corresponding to a target pixel in the image, the visible laser beam is output in a first period and the invisible laser beam is output in a second period different from the first period.

Still another aspect of the present disclosure provides a non-transitory computer-readable storage medium storing a program for causing a computer to execute a control method of a projection apparatus which includes a first laser beam source configured to output a visible laser beam, a second laser beam source configured to output an invisible laser beam, and a scan unit configured to project an image by scanning a projection surface using the visible laser beam output from the first laser beam source and the invisible laser beam output from the second laser beam source, the method comprising: controlling a timing at which the first laser beam source outputs the visible laser beam and a timing at which the second laser beam source outputs the invisible laser beam so that, in a period corresponding to a target pixel in the image, the visible laser beam is output in a first period and the invisible laser beam is output in a second period different from the first period.

According to the present invention, it is possible to suppress a reduction in the luminance of a projected image while suppressing a reduction in the image quality caused by misregistration with respect to an apparatus that projects an image using laser beams.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a schematic diagram related to a positional relationship between a scan trajectory and projected pixels in the first embodiment.

FIG. 4 is a block diagram showing an exemplary functional configuration of a laser control unit according to the first embodiment.

FIGS. 11A to 11C are schematic diagrams showing an example of a beam source control signal according to the third embodiment.

FIGS. 12A to 12C are schematic diagrams showing an example of a beam source control signal according to the third embodiment.

DESCRIPTION OF THE EMBODIMENTS

First Embodiment

Figure 1:
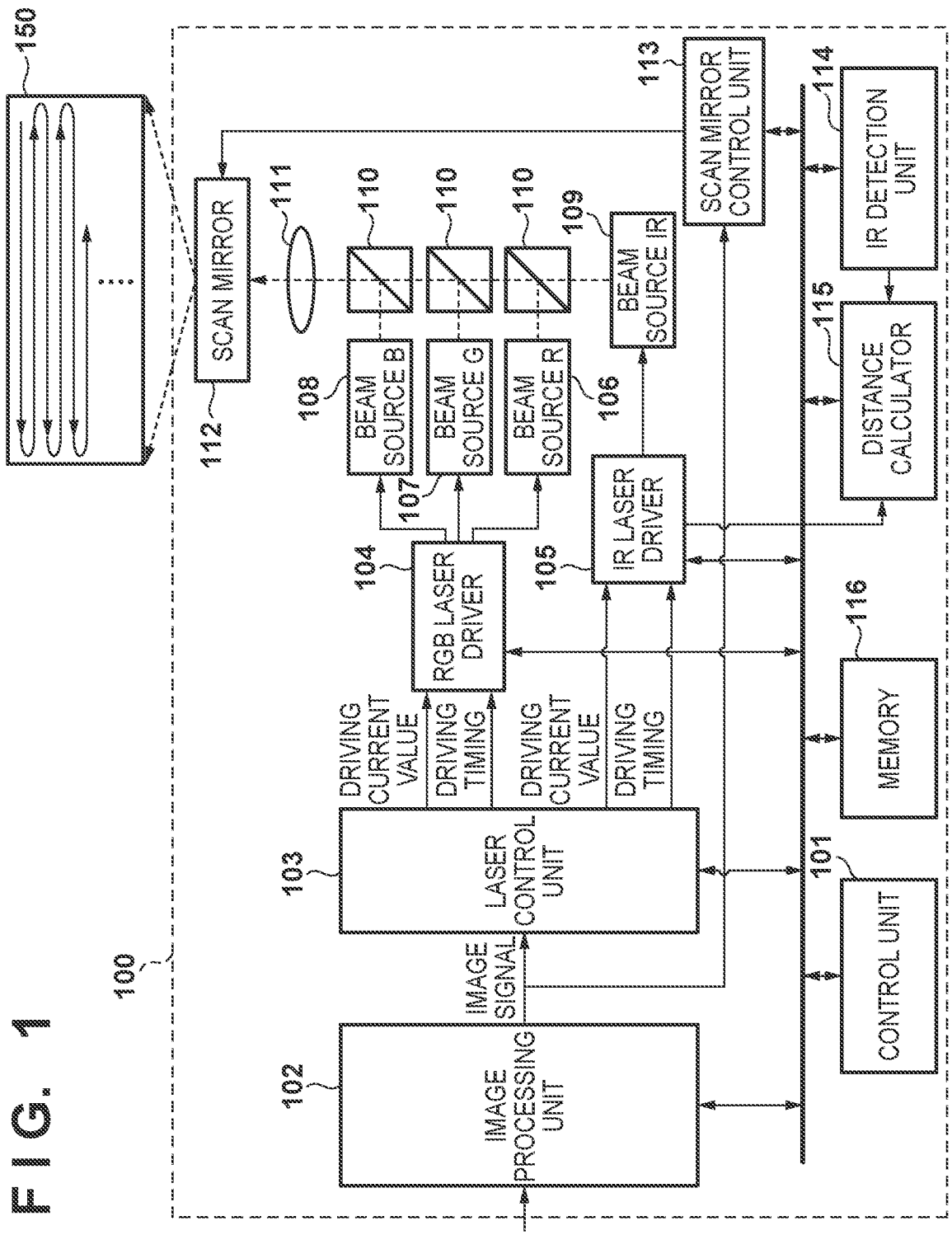
FIG. 1 is a block diagram showing an exemplary functional configuration of a projection apparatus according to a first embodiment.

The following describes an exemplary embodiment of the present invention in detail with reference to the drawings. FIG. 1 is a block diagram showing an exemplary functional configuration of a laser scan projector (hereinafter simply referred to as a projector) 100 as one example of a projection apparatus according to the present invention.

A control unit 101 controls the operations of each functional block of the projector 100 by reading programs stored in a nonvolatile memory included in a memory 116 into a system area of the memory 116 and executing the programs. Note that an image processing unit 102, a laser control unit 103, and a scan mirror control unit 113, which will be described later, may be realized by the control unit 101 executing the programs.

The image processing unit 102 generates an image to be projected (display image) by applying predetermined processing to an input image. For example, it performs processing for changing the number of frames, the number of pixels, and the image shape of the image, processing for correcting the colors and tones of the image, and the like. The input image is input, via wired or wireless communication, from an arbitrary electronic device that can communicate with the projector 100; examples of the electronic device include a personal computer, a file server, a smartphone, a cloud storage medium, and a digital camera. Also, the input image may be input from a memory card or a USB memory connectable to the projector 100, the memory 116 of the projector 100, or the like. Furthermore, the input image may be a moving image or a still image. Note that the input image may be input as a signal with a preset data format, and may contain subsidiary information, such as horizontal/vertical synchronization signals and metadata, aside from the input image.

Based on an input image signal, the laser control unit 103 generates beam source control signals for projecting corresponding projection pixels. The beam source control signals vary depending on the types and the number of beam sources. As the projector 100 includes three visible beam sources corresponding to red, green, and blue (RGB) and an invisible beam source corresponding to infrared (IR), the laser control unit 103 generates beam source control signals that respectively correspond to the four beam sources. That is, the laser control unit 103 controls projection timings for visible beam images and invisible beam images projected by the projector 100 by controlling output levels and output timings of the four laser beam sources using the beam source control signals. In the present embodiment, the beam source control signals are composed of driving current levels and driving waveform patterns. Note that the control unit 101 may include therein the laser control unit 103 and realize the functions of the laser control unit 103. The specifics of the beam source control signals will be described later with reference to FIGS. 2 to 5 and FIGS. 6A to 6E.

Based on the beam source control signals output from the laser control unit 103, an RGB laser driver 104 modulates driving currents of the corresponding laser beam sources and outputs the modulated driving currents to the laser beam sources. Meanwhile, based on the beam source control signal output from the laser control unit 103, an IR laser driver 105 modulates a driving current of the corresponding laser beam source and outputs the modulated driving current to the laser beam source.

Laser beam sources 106, 107, 108 are visible laser beam sources, and output laser beams in accordance with the driving currents supplied from the RGB laser driver 104. The laser beam source 106 outputs red light (R), the laser beam source 107 outputs green light (G), and the laser beam source 108 outputs blue light (B). Meanwhile, a laser beam source 109 is an invisible laser beam source, and outputs a laser beam composed of infrared light (IR) in accordance with the driving current supplied from the IR laser driver 105.

Dichroic mirrors 110 have the properties of reflecting light of a specific wavelength and transmitting light of other wavelengths. Using such properties, the dichroic mirrors 110 synthesize the laser beams of respective colors output from the four laser beam sources 106 to 109, thereby obtaining a laser beam including red light, green light, and blue light (visible light) as well as infrared light (invisible light). The laser beam emitted from the dichroic mirrors 110 is collected by a lens 111 and becomes incident on a scan mirror 112.

The scan mirror 112 reflects the laser beam incident from the lens 111 to change a light path to a direction toward a projection surface. That is, the scan mirror 112 functions as a projection unit that forms a projected image on the projection surface by projecting the laser beams from the plurality of visible laser beam sources and the laser beam from the invisible laser beam source. A reflective surface of the scan mirror 112 has a variable angle. Changing the angle of the reflective surface of the scan mirror 112 using the scan mirror control unit 113 makes it possible to cause the laser beam reflected by the scan mirror 112 to scan a screen 150 two-dimensionally.

The scan mirror control unit 113 generates a driving signal for driving the scan mirror 112 in a horizontal direction and a vertical direction within a preset angle range based on horizontal and vertical synchronization signals input from the image processing unit 102, and supplies the driving signal to the scan mirror 112. Note that the angle range may include fixed values, and may be preregistered with, for example, the memory 116. Alternatively, the angle range may be dynamically determined based on, for example, the resolution of the projected image using a predetermined table that has been preregistered with the memory 116.

An IR detection unit 114 detects the infrared laser beam that has been output from the laser beam source 109 and reflected by the projection surface. The IR detection unit 114 includes, for example, a photodiode. A distance calculator 115 obtains a distance to an object (e.g., the projection surface) irradiated by the infrared laser beam from a relationship between an output timing of the infrared laser beam output from the laser beam source 109 and a detection timing of the reflected light detected by the IR detection unit 114. For example, the distance calculator 115 performs distance detection using a Time of Flight (TOF) method. Specifically, first, a time difference between the output of the infrared laser beam from the laser beam source 109 and the detection of the reflected infrared laser beam by the IR detection unit 114 is measured. This time difference is a period required for light to travel a round-trip distance to and from the reflective surface. Therefore, the distance to the reflective surface can be calculated using the following Expression 1.

Distance to reflective surface=light speed×time difference÷2        Expression 1

The memory 116 is a storage medium that includes a rewritable nonvolatile memory and stores information necessary for the operations of the projector 100. The information stored in the memory 116 includes programs to be executed by the control unit 101, setting values of the projector 100, GUI image data, and the like. Furthermore, the memory 116 is used as a system memory that is used by the control unit 101 to execute programs, as a buffer memory for input images and display images, and the like. The memory 116 may be a combination of a volatile memory and a nonvolatile memory.

(Sequence of Operations Pertaining to Projection Processing for Input Image)

Figure 2:
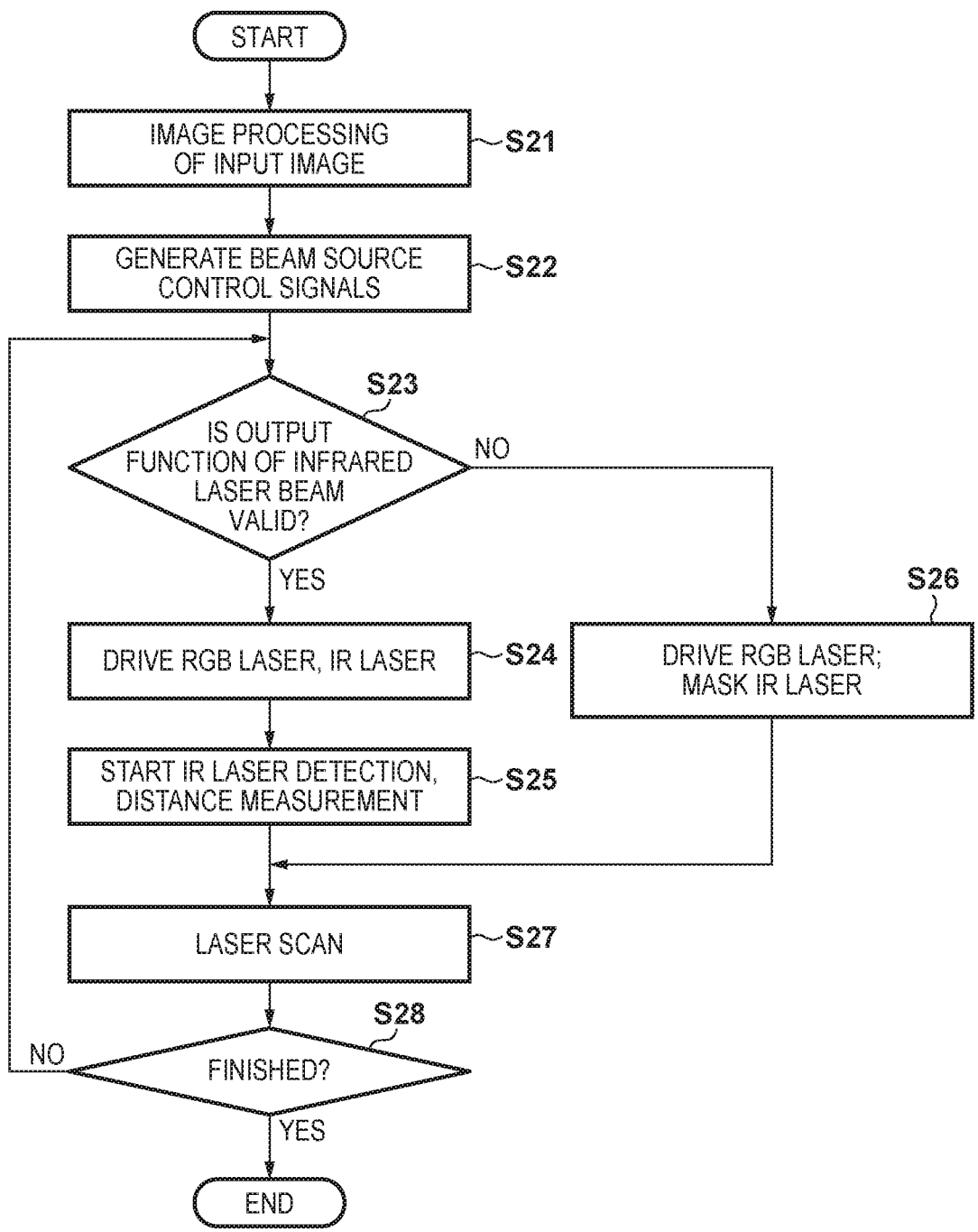
FIG. 2 is a flowchart related to the operations of projection processing according to the first embodiment.

Next, a sequence of operations pertaining to projection processing for an input image will be described with reference to FIG. 2. Note that the present processing is realized as the control unit 101 controls each component of the projector 100 by reading programs stored in the nonvolatile memory of the memory 116 into the system area of the memory 116 and executing the programs, or realized by being executed by the control unit 101 itself. Also, the present processing is started in a state where power is supplied to each component from a non-illustrated power source of the projector 100, initialization processing and the like for the programs, etc. have been completed, and the input image can be displayed.

In step S21, the image processing unit 102 applies predetermined image processing to an input image. For example, the image processing unit 102 obtains the resolution of the input image from metadata of the input image, and also converts the input image so that the input image has the resolution and frame rate set by an instruction from the control unit 101. The image processing unit 102 also performs processing for correcting the colors and tones of the input image based on a user instruction or the like. It will be assumed here that the resolution and frame rate set by the instruction from the control unit 101 are, for example, the resolution and frame rate conforming to display conditions set by a user. The resolution and frame rate set by the instruction from the control unit 101 may be the resolution and frame rate corresponding to display conditions determined by conditions under which the laser beam sources 106 to 109, the laser drivers 104, 105, the scan mirror 112, and the scan mirror control unit 113 can be driven.

In step S22, the laser control unit 103 generates beam source control signals for outputting red, green, and blue laser beams (that is, visible laser beams) and a beam source control signal for outputting an infrared laser beam (that is, an invisible laser beam). An example of specific operations of generating the beam source control signals will be described later using FIG. 3 to FIGS. 6A to 6E.

In step S23, the control unit 101 determines whether to output the infrared laser beam from the projector 100. At this time, the control unit 101 makes this determination based on, for example, a setting value that is stored in the memory 116 and that sets whether to detect a distance. In other words, in step S23, the control unit 101 determines whether the output function of the infrared laser beam is set to be valid. The control unit 101 proceeds to step S24 if it is determined that the infrared laser beam is to be output, and proceeds to step S26 if it is determined that the infrared laser beam is not to be output. Note that as the infrared laser beam is projected in order to detect a distance to the projection surface or a distance to a detection target object on the projection surface, the infrared laser beam may be set so that it is not projected temporarily when this detection is unnecessary. In this case, the setting value that sets whether to detect a distance is set to indicate that the detection is not to be performed. Furthermore, it is permissible to dynamically switch between a state where the infrared laser beam is output and a state where the infrared laser beam is not output during a projection operation. For example, the control unit 101 may determine whether to output the infrared laser beam based on user settings, or may make this determination in accordance with an operational state—e.g., the infrared laser beam is output only at the time of activation or at the time of initial installation. In this case, when having determined to switch between the state where the infrared laser beam is output and the state where the infrared laser beam is not output, the control unit 101 dynamically switches the setting value that sets whether to detect a distance. In order to simplify the processing, the infrared laser beam may be output constantly.

Note that the processing of step S23 may be executed before the processing of step S21. When the processing is carried out after determining in advance whether to output the infrared laser beam, there is no need to generate the beam source control signal corresponding to the infrared laser beam.

In step S24, the RGB laser driver 104 drives the laser beam sources 106, 107, and 108 so that they respectively output the red, green, and blue laser beams. Also, the IR laser driver 105 drives the laser beam source 109 so that it outputs the infrared laser beam. The laser beam sources 106, 107, 108 output laser beams composed of visible light (red, green, and blue laser beams), with intensities corresponding to pixel values of respective pixels in an image signal, at timings corresponding to the positions of the respective pixels. Also, the laser beam source 109 outputs a laser beam composed of invisible light (infrared laser beam), with an intensity that is necessary for detection of an operation as will be described later.

In step S25, the IR detection unit 114 starts detection of the infrared laser beam reflected by the projection surface. Also, the distance calculator 115 calculates a distance to the projection surface based on the detected infrared laser beam.

In step S26, the RGB laser driver 104 drives the laser beam sources 106, 107, and 108 so that they output the red, green, and blue laser beams. Also, the IR laser driver 105 prevents the infrared laser beam from being output by, for example, masking the input beam source control signal.

In step S27, the control unit 101 projects an image onto the projection surface by controlling the scan mirror control unit 113 and the scan mirror 112 to cause the emitted laser beams to perform scanning. In step S28, the control unit 101 determines whether a projection ending instruction has been input. The control unit 101 determines whether the projection ending instruction has been input in accordance with, for example, a user operation on a non-illustrated operation unit; the control unit 101 ends the present processing when it is determined that the projection ending instruction has been input, and returns to step S23 when it is determined that the projection ending instruction has not been input. Note that when the image processing unit 102 has detected the cessation of the input of an image from an external apparatus, the projection ending instruction may be deemed to have been input.

Although the above has described an example in which the beam source control signal corresponding to the infrared laser beam is generated in the aforementioned processing of step S22 also when the infrared laser beam is not projected, no limitation is intended by this example. For example, the beam source control signal corresponding to the infrared laser beam may be generated only when the infrared laser beam is output through the processing of step S23.

(Processing for Generating Beam Source Control Signals)

Next, a description is given of a specific example of an operation performed by the laser control unit 103 to generate the beam source control signals in step S22. FIG. 3 schematically shows a scan trajectory of a laser beam and projected pixels for a case where the projector 100 performs scanning for pixels corresponding to one line. Note that the projected pixels are represented by superimposition of red pixels, green pixels, and blue pixels that are respectively output from the red, green, and blue laser beam sources. Furthermore, in the present embodiment, it will be assumed that there are 2000 pixels in a horizontal direction of the projector 100, a leftmost pixel in the horizontal direction is P0, a pixel in a central portion in the horizontal direction is P1000, and a rightmost pixel in the horizontal direction is P1999. It will also be assumed that a period of scanning one line is Th, and a period between projection of the pixel P0 and completion of projection of the pixel P1999 is Tde. As edge portions of the screen in which the scanning direction is reversed are generally not used in pixel projection, the relationship Th>Tde is satisfied as shown in FIG. 3. Note that the screen may be used up to its edge portions in pixel projection (Th=Tde).

A description is now given of the specifics of an exemplary functional configuration of the laser control unit 103 with reference to FIG. 4. The laser control unit 103 includes, for example, a reference signal generation unit 401, a driving waveform generation unit 402, a driving waveform generation unit 403, a driving current determination unit 404, and a driving current determination unit 405.

The reference signal generation unit 401 generates a timing signal that serves as a reference based on which the driving waveform generation unit 402 and the driving waveform generation unit 403 generate driving waveform patterns, and outputs the timing signal to the driving waveform generation unit 402 and the driving waveform generation unit 403.

The driving waveform generation unit 402 generates driving waveform patterns to be output to the RGB laser driver 104. On the other hand, the driving waveform generation unit 403 generates a driving waveform pattern to be output to the IR laser driver 105. The driving current determination unit 404 computes driving current levels (driving current values) to be output to the RGB laser driver 104. On the other hand, the driving current determination unit 405 computes a driving current level to be output to the IR laser driver.

Figure 5:
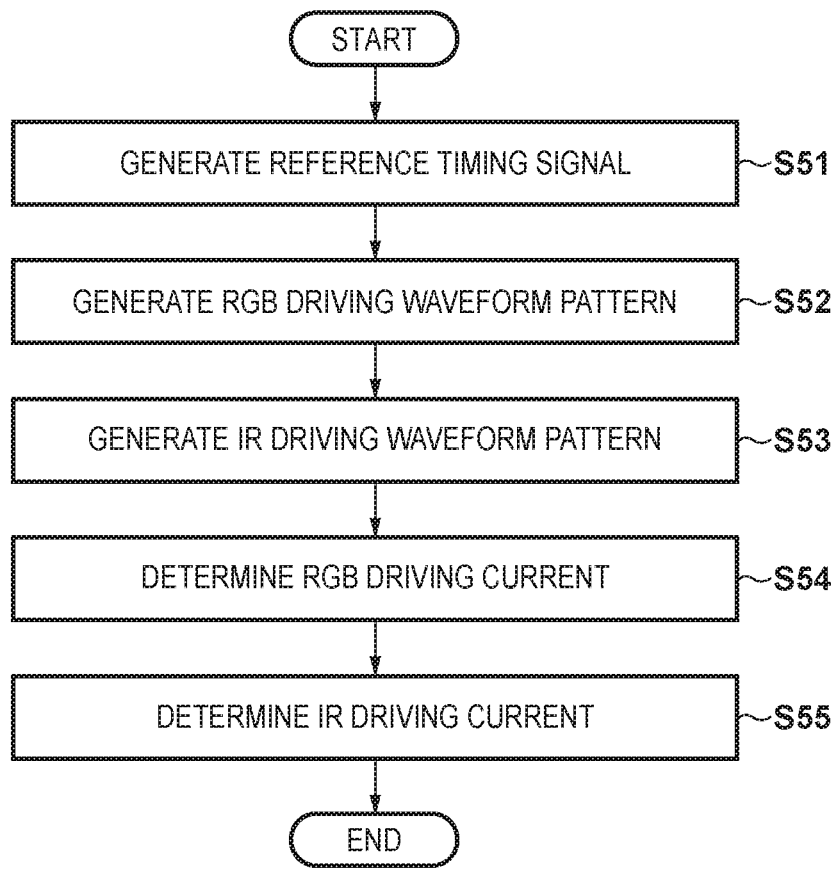
FIG. 5 is a flowchart related to processing for generating beam source control signals according to the first embodiment.
Figure 6:
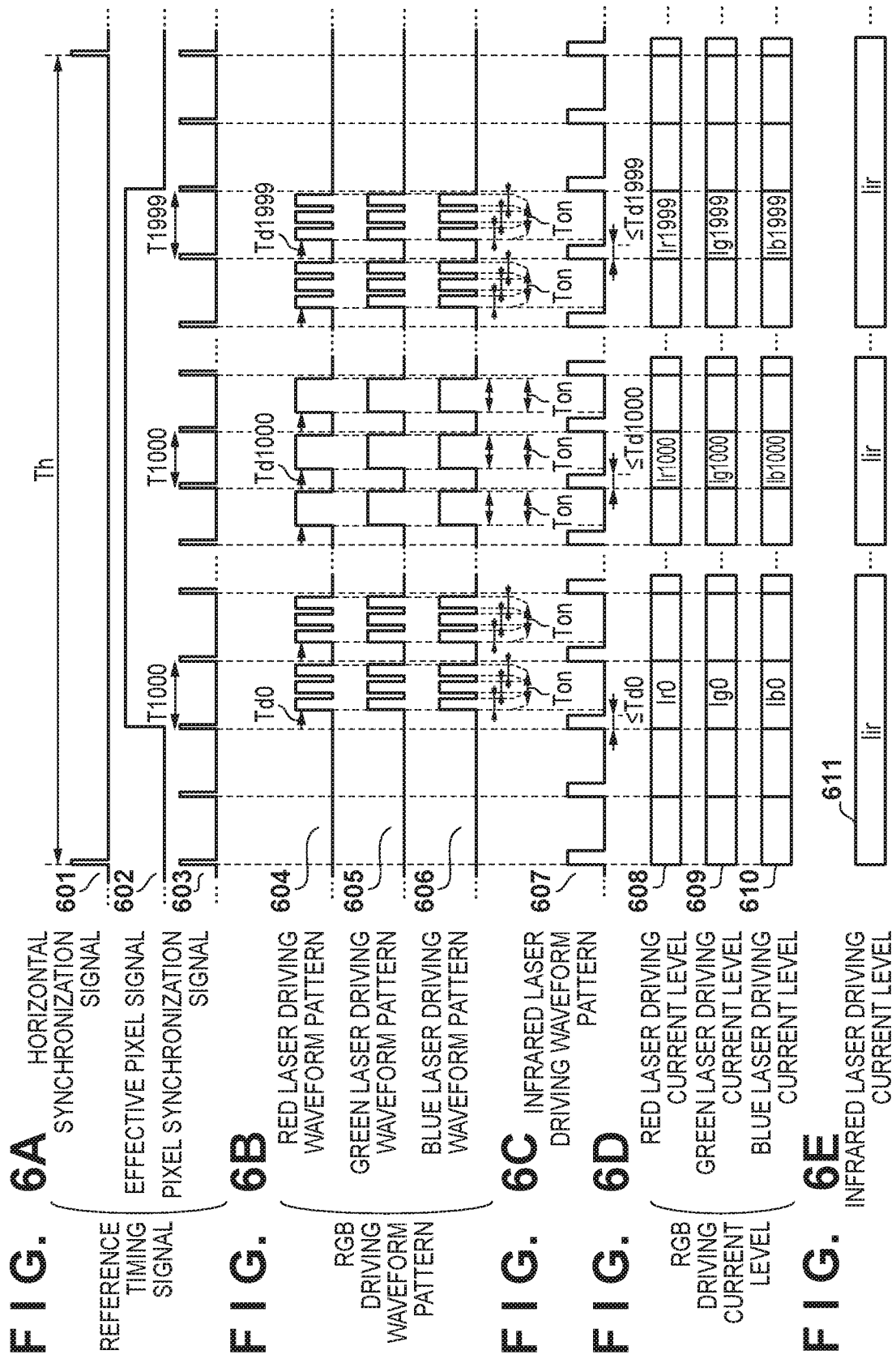
FIGS. 6A to 6E are schematic diagrams showing an example of a beam source control signal according to the first embodiment.

Next, a description is given of exemplary operations of the processing for generating the beam source control signals in step S22 with reference to FIG. 5.

In step S51, the reference signal generation unit 401 generates a reference timing signal based on an image signal processed by the image processing unit 102. FIG. 6A shows an example of the reference timing signal according to the present embodiment. In the present embodiment, the reference timing signal is composed of three timing signals described below.

A horizontal synchronization signal 601 is a signal indicating a period for which the projector 100 scans one line. The period Th shown in FIG. 3 is the same as the period Th shown in FIG. 6A. An effective pixel signal 602 is a signal indicating a period that is used for pixel projection within the period Th. As shown in FIG. 3, in the present embodiment, edge portions of the screen in which the scan direction is reversed are not used in pixel projection. That is, a period in which the effective pixel signal 602 is High is shorter than the period Th.

A pixel synchronization signal 603 is a signal indicating a period for which the projector 100 performs scanning for one pixel (pixel period). The pixel period is an irradiation period for which irradiation is performed using the RGB laser beams corresponding to a certain pixel included in an image signal and the IR laser beam. A period of scanning for one pixel includes a period in which the pixel is projected and a period in which the pixel is not projected in order to leave a predetermined interval from a neighboring pixel. In the present embodiment, as there are 2000 pixels in the horizontal direction of the projector 100, the reference signal generation unit 401 generates a pulse signal so that the pixel synchronization signal 603 becomes High 2000 times during the period in which the effective pixel signal 602 is High. Furthermore, the reference signal generation unit 401 generates a pulse signal in an arbitran cycle also in a period in which the effective pixel signal 602 is Low.

Note that the reference signal generation unit 401 generates the pixel synchronization signal 603 so that a cycle of the pixel synchronization signal 603 in which a pixel in the edge portion of the screen is projected (e.g., T0 and T1999) is longer than a cycle of the pixel synchronization signal 603 in which a pixel in the central portion of the screen is projected (e.g., T1000). This is intended to make uniform the size of pixels displayed on the projection surface, and the interval between the pixels. This is because the size of pixels and the interval between pixels on the projection surface are dependent on the angular velocity of the scan mirror 112, and the angular velocity of the scan mirror 112 is generally high in the central portion of the screen and low in the edge portions of the screen. That is, the reference signal generation unit 401 makes uniform the size of pixels and the interval between pixels on the projection surface by giving the pixel synchronization signal 603 a longer cycle in the edge portions of the screen with a low angular velocity (T0 and T1999) than in the central portion of the screen with a high angular velocity (T1000). Note that information indicating the cycles of the pixel synchronization signal 603 for respective pixels may be recorded in, for example, the memory 116 in advance. In this case, it is sufficient for the reference signal generation unit 401 to obtain the information indicating the cycles of the pixel synchronization signal 603 that has been read out from the memory 116, and use the obtained information. Note that in order to simplify the processing, the same pixel synchronization cycle may be used for the central portion of the screen and the edge portions of the screen.

In step S52, the driving waveform generation unit 402 generates driving waveform patterns 604 to 606 for the red, green, and blue lasers, respectively, based on the reference timing signal generated in step S51. Examples of the driving waveform patterns 604 to 606 for the red, green, and blue lasers are shown in FIG. 6B. According to the examples shown in FIG. 6B, in a period in which the driving waveform patterns 604 to 606 are high, the laser beams are output, thereby projecting a red pixel, a green pixel, and a blue pixel that compose one pixel (also simply referred to as an "RGB pixel"). Precisely, the longer the period in which the driving waveform patterns 604 to 606 are high, the brighter the projected pixel. However, for the sake of brevity, it will be assumed in the present embodiment that the period Ton in which the laser beams are output is the same for all pixels, and the brightness of the projected pixel is controlled by the values of the currents that drive the laser beam sources, which are controlled by the processing of step S55 as will be described later.

As shown in FIG. 6B, the driving waveform generation unit 402 renders the driving waveform patterns 604 to 606 for the red, green, and blue lasers High if the effective pixel signal 602 is High when a delay period Td has elapsed since the pixel synchronization signal 603 became High.

Here, the delay period Td is a period intended to secure a predetermined interval between neighboring projected pixels. That is, the RGB pixel is not projected during the delay period Td. Note that a value based on the angular velocity (e.g., Td0, Td1000, and Td1999) is set also with respect to the delay period Td. The value of the delay period Td for each pixel, which varies depending on the angular velocity, may be recorded in, for example, the memory 116 in advance, and the driving waveform generation unit 402 can generate the driving waveform patterns 604 to 606 using the value of the delay period Td that has been read out from the memory 116.

Furthermore, after rendering the driving waveform patterns 604 to 606 High, the driving waveform generation unit 402 renders them Low when a cumulative period in which the respective driving waveform patterns were High has reached a predetermined value (e.g., Ton).

At this time, with respect to pixels in the edge portions of the screen (e.g., the pixel P0 and the pixel P1999), the driving waveform generation unit 402 renders the driving waveform patterns Low when the cumulative period in which the driving waveform patterns were High has reached Ton, with the insertion of a Low period which is a minute amount of time. In other words, it can be said that the driving waveform generation unit 402 generates the driving waveform patterns (determines an output period of the visible laser beams) so that the cycle of the pixel synchronization signal includes a plurality of High waveforms that together make the cumulative period in which the driving waveform patterns were High reach Ton. On the other hand, with respect to pixels in the vicinity of the center of the screen (pixel P1000), the driving waveform generation unit 402 generates the driving waveform patterns so that the cycle of the pixel synchronization signal includes a single High waveform having a length of Ton.

This is implemented to make uniform the size of pixels displayed on the projection surface. That is, due to the insertion of the Low period, which is a minute amount of time, a period from the start of laser beam emission and the completion of laser beam emission is longer for the edge portions of the screen (T0 and T1999) in which the scan mirror 112 has a low angular velocity than for the central portion of the screen (Tw1000) in which the scan mirror 112 has a high angular velocity. A diameter of a pixel that is projected onto the projection screen as a result of laser beam scanning (a spot diameter) is proportional to a value obtained by multiplying a period tz from the start of laser beam emission to the completion of laser beam emission in a pixel cycle corresponding to each pixel by an angular velocity. That is, a spot diameter d1 of a pixel in the edge portion corresponds to a value obtained by multiplying a period tz1 by a velocity v1, and a spot diameter d2 of a pixel at the center corresponds to a value obtained by multiplying a period tz2 by a velocity v2. Here, as stated earlier, due to the relationships tz1>tz2 and v1<v2, the difference between the spot diameter d1 and the spot diameter d2 becomes small, and projected pixels become more uniform in size.

Note that it is sufficient to record information that specifies the Low period into, for example, the memory 116 in advance, and the driving waveform generation unit 402 may use the information that specifies the Low period that has been read out from the memory. For simplicity, the same driving waveform pattern may be used with respect to the edge portions and the central portion of the screen.

As the driving waveform generation unit 402 generates the driving waveform patterns respectively for the red, green, and blue lasers in the above-described manner, the emission can be started at the same timing and completed at the same timing (that is, projection can be performed within the same period) for a red pixel, a green pixel, and a blue pixel that compose one pixel. That is, the projection positions of a red pixel, a green pixel, and a blue pixel that compose one pixel can be aligned with one another. As a result, the red, green, and blue laser beam sources can be driven so as to prevent an inter-color shift (misregistration) in a projected image.

In step S53, the driving waveform generation unit 403 generates a driving waveform pattern 607 of the infrared laser beam shown in FIG. 6C (determines an output period of the invisible laser beam) in accordance with the reference timing signal shown in FIG. 6A. In FIG. 6C, a period in which the driving waveform pattern is High is a period in which the infrared laser beam is output. As shown in FIG. 6C, the driving waveform generation unit 403 renders the driving waveform pattern 607 of the infrared laser beam High when the pixel synchronization signal 603 becomes High, and then renders the driving waveform pattern 607 Low before the period Td elapses. The driving waveform generation unit 403 generates the driving waveform pattern 607 of the infrared laser beam so that the waveform pattern of the infrared laser beam is High in a period that is different from a period in which the waveform patterns of the RGB laser beams generated by the driving waveform generation unit 402 are High. That is, the driving waveform pattern 607 of the infrared laser beam is generated so that, within the pixel period (irradiation period) corresponding to each pixel, the IR laser beam is output in the period Td that is different from the period (Ton) in which the RGB laser beams are output.

Note that the driving waveform pattern of the infrared laser beam is not limited to the one described above. For example, when the distance to the projection surface is short and can be detected with sufficiently high accuracy without emitting the infrared laser beam on a per-pixel basis, the infrared laser beam may be output at the rate of once every few pixels. That is, when it is determined that the distance to the projection surface is equal to or shorter than a predetermined threshold, the driving waveform generation unit 403 may thin out the number of times the infrared laser beam is output so that the number is smaller by a predetermined percentage than the number of times the red, green, and blue lasers are output. Alternatively, in a case where it is sufficient to check the distance to the projection surface approximately once every few seconds, the infrared laser beam may be output only once every few frames. That is, when it is determined that the output frequency can be reduced in accordance with the settings or the like, the driving waveform generation unit 403 may restrict the infrared laser beam to be output within a period in which a specific frame is projected.

By generating the driving waveform pattern of the infrared laser beam in the above-described manner, the generated driving waveform pattern can prevent the infrared laser beam from being output simultaneously with the red, green, and blue laser beams. That is, it is possible to create a difference between the period in which the red, green, and blue laser beams having an intensity higher than a predetermined intensity are output and the period in which the infrared laser beam having an intensity higher than the predetermined intensity is output. This can suppress the maximum value (worst value) of an instantaneous total output (pulse output) of the lasers emitted from the projector 100. With regard to a projector that emits laser beams, safety regulations set the maximum output value at which pulse output can be performed. In a case where the red, green, and blue laser beams and the infrared laser beam are projected simultaneously, the total output of the four laser beams must not exceed the value set by the safety regulations. Meanwhile, in the present embodiment, as the driving waveform patterns are generated so that the period in which the red, green, and blue laser beams are output is different from the period in which the IR laser beam is output, it is sufficient to set the total output of the three laser beams composed of the red, green, and blue laser beams so that it does not exceed the value set by the safety regulations. That is, the output of the red, green, and blue laser beams can be further increased, and the luminance of the projected image can be increased.

On the other hand, as the timing for outputting the red, green, and blue laser beams is shifted from the timing for outputting the infrared laser beam, the position of the projected pixel (red, green, and blue pixels) is shifted from the projection position of the infrared laser beam. However, because the infrared laser beam is invisible, no problem arises in terms of image quality, unlike the case where the projection position of the red, green, and blue pixels is shifted. Furthermore, as the shift between the position of the projected pixel and the projection position of the infrared laser beam is minute (half pixel's worth), no practical problem arises also in connection with the measurement of the distance to the projection surface or the distance to a detection target object on the projection surface. Even in a case where the distance to the projection surface is to be calculated precisely in relation to the position of each projected pixel, as the relative positional relationships between the positions of the projected pixels and the projection position of the infrared laser beam are known, the distance to each projected pixel can also be calculated by, for example, interpolation computation. Conversely, as the red, green, and blue laser beams are projected in the same period, a positional shift relative to the red, green, and blue pixels (misregistration) can be reduced.

Thus, a reduction in the luminance of the projected pixel formed by the red, green, and blue laser beams attributed to the use of the infrared laser beam can be suppressed without practically lowering the usability of distance measurement using the infrared laser beam.

In step S54, the driving current determination unit 404 determines driving current levels of the red, green, and blue lasers, respectively, based on pixel values of respective pixels in the projected image. The projected pixel becomes dark as the driving current determination unit 404 reduces the driving current levels, and the projected pixel becomes bright as the driving current determination unit 404 increases the driving current levels.

In the present embodiment, the maximum driving current levels of the respective laser beams are determined in advance so that the total output of the three laser beams composed of the red, green, and blue laser beams does not exceed the value set by the safety regulations when the red, green, and blue pixel values of the projected image are at their respective maximum values. At this time, the driving current determination unit 404 determines the driving current levels, on a per-projected pixel basis, by multiplying a rate corresponding to the pixel value of the projected image by the maximum driving current level. For example, assume that the pixel value of the projected image is represented by 8-bit data (0 to 255) for each color. When a red pixel value of a certain pixel is 255, the driving current level of the red laser beam for this pixel is the maximum driving current level. On the other hand, when a red pixel value of a certain pixel is 127, the driving current level of the red laser beam for this pixel is approximately half the maximum driving current level (127/255).

FIG. 6D exemplarily shows driving current levels 608 to 610 of the red, green, and blue laser beam sources. In the present embodiment, it will be assumed that the driving currents of red light for displaying the pixels P0, P1000, and P1999 are Ir0, Ir1000, and Ir1999, respectively. Similarly, it will be assumed that the driving currents of green light for displaying the pixels P0, P1000, and P1999 are Ig0, Ig1000, and Ig1999, respectively, and the driving currents of blue light for displaying the same are Ib0, Ib1000, and Ib1999, respectively.

In step S55, the driving current determination unit 405 determines the driving current level of the infrared laser beam. FIG. 6E exemplarily shows a driving current level 611 of the infrared laser beam source. A higher driving current level makes it easier to detect the infrared laser beam reflected by the projection surface, and thus makes it possible to increase a detectable distance to the projection surface. In the present embodiment, the maximum driving current level at which a single output of the infrared laser beam does not exceed the value set by the safety regulations is recorded in, for example, the memory 116 in advance. For example, it will be assumed that a driving current Iir is the maximum driving current level. Note that the driving current level of the infrared laser beam may be controlled in accordance with the distance between the projector and the projection surface. For example, the driving current level of the infrared laser beam may be determined so that the driving current level is higher when the distance between the projector and the projection surface exceeds a predetermined threshold than when the distance is equal to or shorter than the predetermined threshold. Also, the driving current level of the infrared laser beam may be determined in accordance with user settings. When the driving current determination unit 405 has completed the computation of the driving current levels, the laser control unit 103 ends the processing for generating the beam source control signals.

The present embodiment has been described using an example in which the driving current levels are determined after the driving waveform patterns are generated. The driving waveform patterns may be generated after the driving current levels are determined. Also, the driving currents may be determined between the processing for generating the RGB driving waveform patterns and the processing for generating the IR driving waveform pattern. In addition, both types of processing may be executed in parallel.

Figure 7:
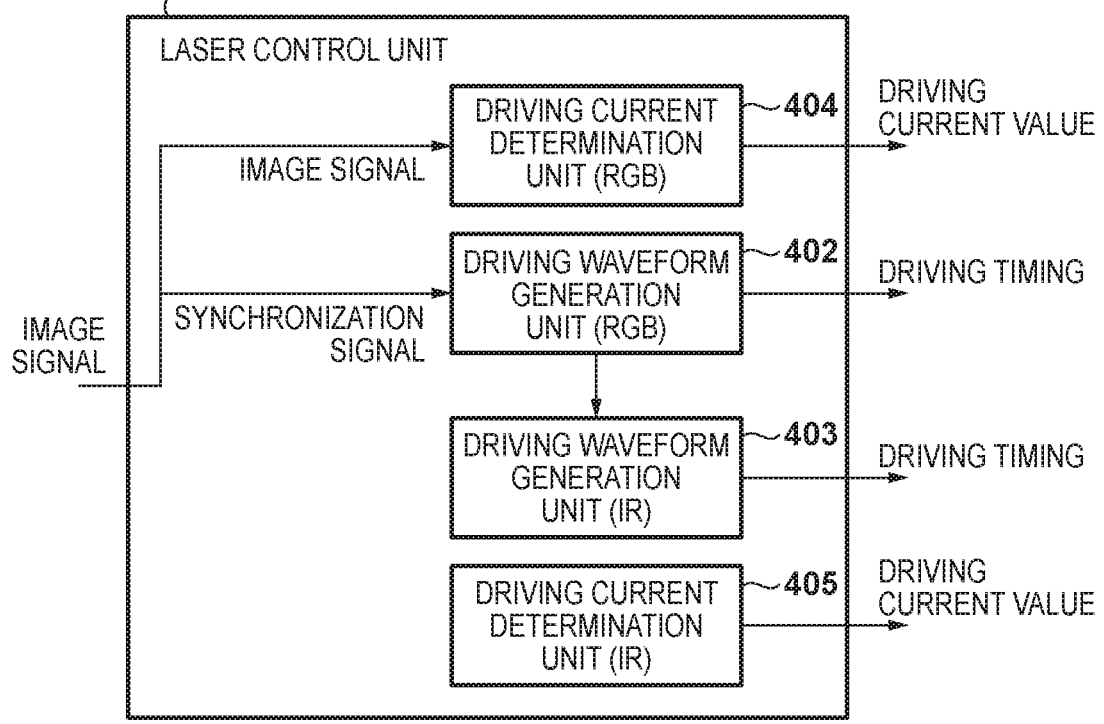
FIG. 7 is a block diagram showing another exemplary functional configuration of the laser control unit according to the first embodiment.

Furthermore, although the present embodiment has been described using an example in which the reference timing signal shown in FIG. 6A is generated, no limitation is intended by this. For example, without generating the reference timing signal, the RGB driving waveform patterns may be generated in accordance with a scan speed of the scan mirror 112, and the IR driving waveform pattern may be generated by inverting the generated RGB driving waveform patterns. In this case, it is sufficient to configure the laser control unit 103 as shown in FIG. 7. That is, the synchronization signals from the image processing unit 102 are input directly to the driving waveform generation unit 402. Furthermore, the RGB driving waveform patterns (driving timings) generated by the driving waveform generation unit 402 are output to the driving waveform generation unit 403 as well. The driving waveform generation unit 403 generates the IR driving waveform pattern based on the input from the driving waveform generation unit 402.

As described above, the operations of the projector 100 of the present embodiment make it possible to suppress a reduction in the luminance of the projected image while suppressing a reduction in the image quality attributed to misregistration with respect to an apparatus that emits visible and invisible laser beams.

To simplify the description, the present embodiment has been described under the assumption that there is no delay in the actual emission of laser beams at a desired intensity after the driving waveform patterns become High, and there is no delay in the actual cessation of the emission of laser beams after the driving waveform patterns become Low. However, even if the delay occurs, the present embodiment can address the delay. In this case, a part of the period in which the red, green, and blue laser beams are output may overlap a part of the period in which the infrared laser beam is output. In this case, the output timings are shifted so that the total of a predetermined intensity of the red, green, and blue laser beams and a predetermined intensity of the infrared laser beam in the overlapping period does not exceed a predetermined reference value (the value set by the safety regulations). In one example, the driving waveform patterns are generated so that a period in which the red, green, and blue laser beams are output at a predetermined intensity does not overlap a period in which the infrared laser beam is output at a predetermined intensity.

Furthermore, although the present embodiment has been described under the assumption that all of the red, green, blue, and infrared laser beam sources share the same delay period between the input of the driving waveform patterns to the laser beam sources 106 to 108 and the actual output of lasers, the delay period may vary. In this case, the emission of the red, green, and blue lasers can be started at the same timing and ended at the same timing by shifting the phase of the driving waveform pattern shown in FIG. 6C in accordance with the delay period. With this configuration, it is sufficient to perform control so that these three laser beams are not emitted in the same period as the infrared laser beam.

Second Embodiment

Next, a second embodiment will be described. Although the second embodiment differs in including an image generation unit 801 that generates bright and dark images from an image signal and a laser control unit 802 that outputs beam source control signals based on the generated bright and dark images, other constituents of a projector are the same. Therefore, the same constituents are given the same reference sign, and duplicate explanations are omitted.

Figure 8:
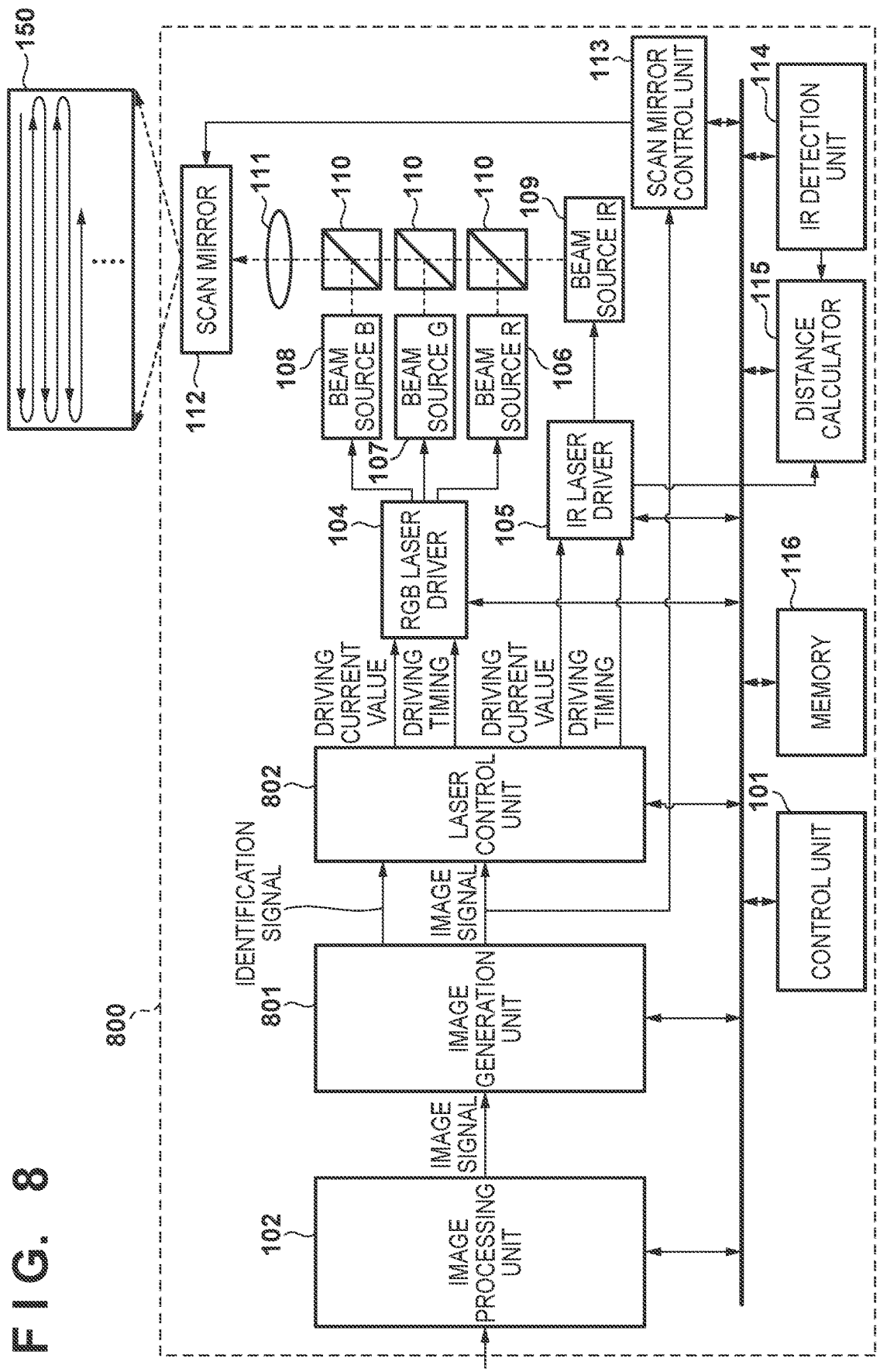
FIG. 8 is a block diagram showing an exemplary functional configuration of a projection apparatus according to a second embodiment.

FIG. 8 shows an exemplary functional configuration of a projector 800 according to the present embodiment. The image generation unit 801 multiplies the frame rate of an input image by N (N>1). It also corrects the input image with the N-fold frame rate to generate an image in which at least one pixel has an increased tone value compared to the input image (a bright image) and an image in which at least one pixel has a reduced tone value compared to the input image (a dark image). The image generation unit 801 further generates an identification signal for identifying the bright image and the dark image, and outputs the identification signal to the laser control unit 802.

Similarly to the first embodiment, based on pixel values of a display image, the laser control unit 802 generates beam source control signals for projecting corresponding projection pixels. Furthermore, judging from the identification signal output from the image generation unit 801, the laser control unit 802 controls an IR laser driver 105 so that an infrared laser beam is not output in a period in which the bright image is projected, and the infrared laser beam is output only in a period in which the dark image is projected.

In a case where the infrared laser beam is output at the rate of once every few frames, the aforementioned configuration of the projector 800 enables control in which the infrared laser beam is output only with respect to a frame for outputting a dark image. That is, a cumulative laser output value of the output performed by the projector 800 in one frame period is lower with respect to a frame for outputting a dark image than a frame for outputting a bright image. Therefore, by outputting the infrared laser beam only with respect to a frame for outputting a dark image under control of the laser control unit 802, the maximum value of a cumulative laser output value of the output performed in one frame period can be suppressed. This can increase the safety for a case where the laser beams emitted from the projector 800 hit the user's eyes.

Third Embodiment

Next, a third embodiment will be described. Although the present embodiment differs from the above-described embodiments in that a projector is a liquid crystal projector, the constituents of the projector other than the constituents related to this difference are the same as those of the first embodiment. Therefore, the same constituents or processes are given the same reference sign, and duplicate explanations are omitted. Although the present embodiment will be described using an example of a transmissive liquid crystal projector of a three-CCD type, the projector may be of any type, including a single-CCD type, a transmissive type, and a reflective type.

A projector 900 according to the present embodiment is a liquid crystal projector, and modulates light from beam sources by controlling the light transmittances of liquid crystal elements 904 to 906 in accordance with an image to be displayed. Then, the image is displayed by projecting, onto a screen, light from the beam sources that has been transmitted through these liquid crystal elements.

Figure 9:
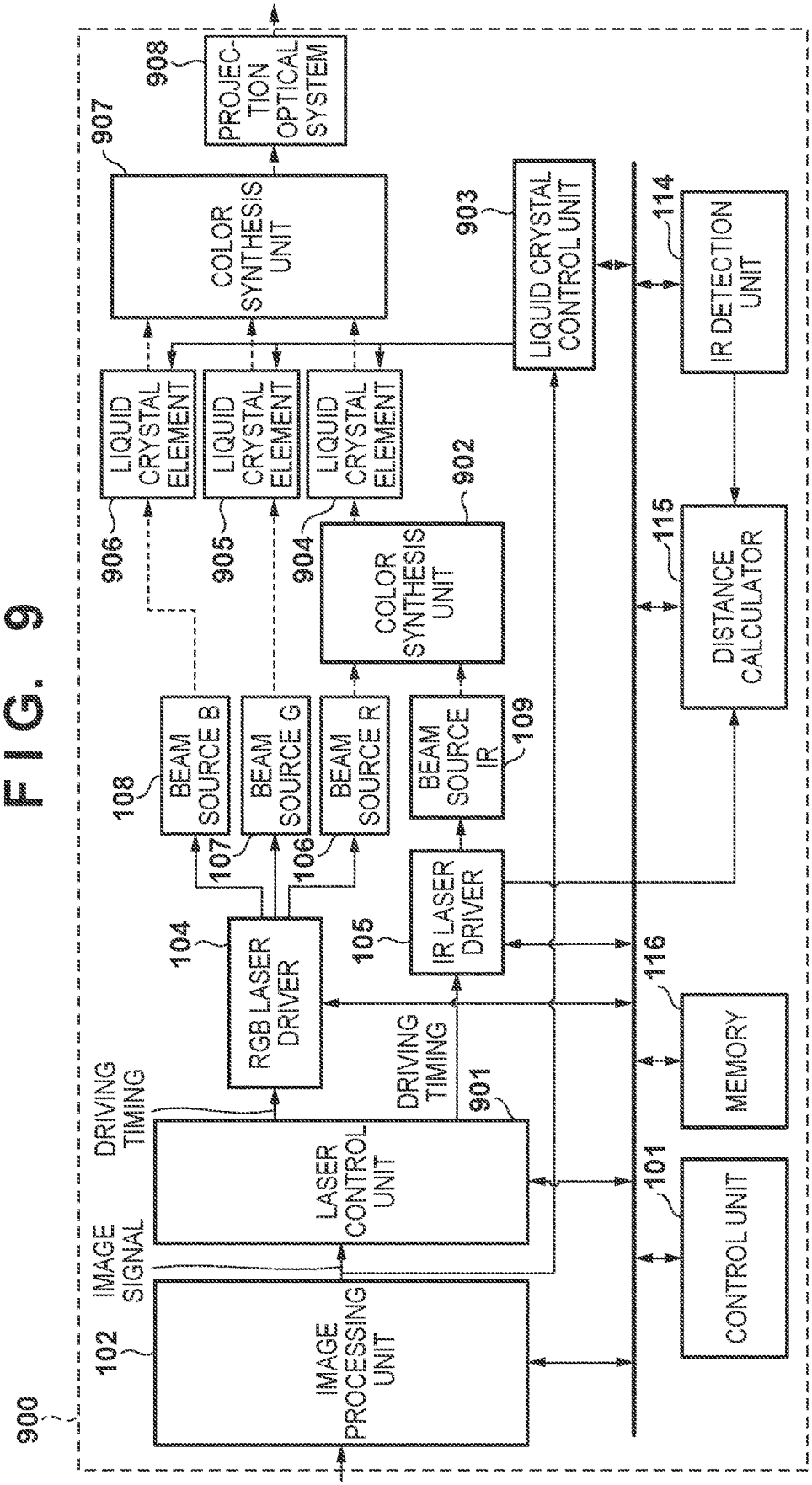
FIG. 9 is a block diagram showing an exemplary functional configuration of a projection apparatus according to a third embodiment.

The following describes an exemplary functional configuration of the projector 900 according to the present embodiment with reference to FIG. 9. The projector 900 includes a laser control unit 901, color synthesis units 902, 907, a liquid crystal control unit 903, liquid crystal elements 904 to 906, and a projection optical system 908.

Based on an input image signal, the laser control unit 901 generates beam source control signals for projecting corresponding projection pixels. In the present embodiment, the beam source control signals are composed only of driving waveform patterns, and pixel values of projected pixels are controlled by the liquid crystal control unit 903, which will be described later. The laser control unit 901 outputs discrete beam source control signals to an RGB laser driver 104 and an IR laser driver 105, respectively. The specifics of the driving waveform patterns included in the beam source control signals of the present embodiment will be described later with reference to FIGS. 11A to 11C. Note that a control unit 101 may include therein the laser control unit 901, and the functions of the laser control unit 901 may be realized by the control unit 101 executing programs stored in a memory 116.

The color synthesis unit 902 synthesizes red light output from a laser beam source 106 and infrared light output from a laser beam source 109, and is composed of, for example, a dichroic mirror, a prism, or the like.

The liquid crystal control unit 903 controls the transmittances of the liquid crystal elements 904 to 906, which will be described later, by controlling a voltage applied to a liquid crystal of each pixel in the liquid crystal elements 904 to 906 based on the image signal processed by an image processing unit 102. Note that the control unit 101 may include therein the liquid crystal control unit 903, and the functions of the liquid crystal control unit 903 may be realized by the control unit 101 executing programs stored in the memory 116.

The liquid crystal element 904 is a liquid crystal element for adjusting the transmittances for a red laser beam and an infrared laser beam output from the color synthesis unit 902. The liquid crystal element 905 is a liquid crystal element for adjusting the transmittance for a green laser beam output from a laser beam source 107. The liquid crystal element 906 is a liquid crystal element for adjusting the transmittance for a blue laser beam output from a laser beam source 107.

Although the transmittances for the red laser beam and the infrared laser beam are adjusted by the same liquid crystal element 904 in the configuration of the present embodiment, no limitation is intended by this. For example, the transmittances for the green laser beam and the infrared laser beam, or the transmittances for the blue laser beam and the infrared laser beam, may be adjusted by the same liquid crystal element. Furthermore, four liquid crystal elements may be provided, and the respective transmittances of the infrared laser beam, green laser beam, blue laser beam, and infrared laser beam may each be adjusted by one liquid crystal element.

The color synthesis unit 907 synthesizes the red laser beam, green laser beam, blue laser beam, and infrared laser beam that have been transmitted through the liquid crystal elements 904 to 906, and is composed of, for example, a dichroic mirror, a prism, or the like. The projection optical system 908 projects the synthesized light output from the color synthesis unit 907 onto a projection surface, and is composed of a plurality of lenses and actuators for driving the lenses. That is, it functions as a projection unit that forms a projected image on the projection surface by projecting visible light and invisible light based on the laser beams. Magnification and reduction of the projected image, focal point adjustment, lens shifting, and the like are performed by the control unit 101 driving the lenses composing the projection optical system 908 using the actuators or the like.

(Sequence of Operations Pertaining to Projection Processing for Input Image)

Figure 10:
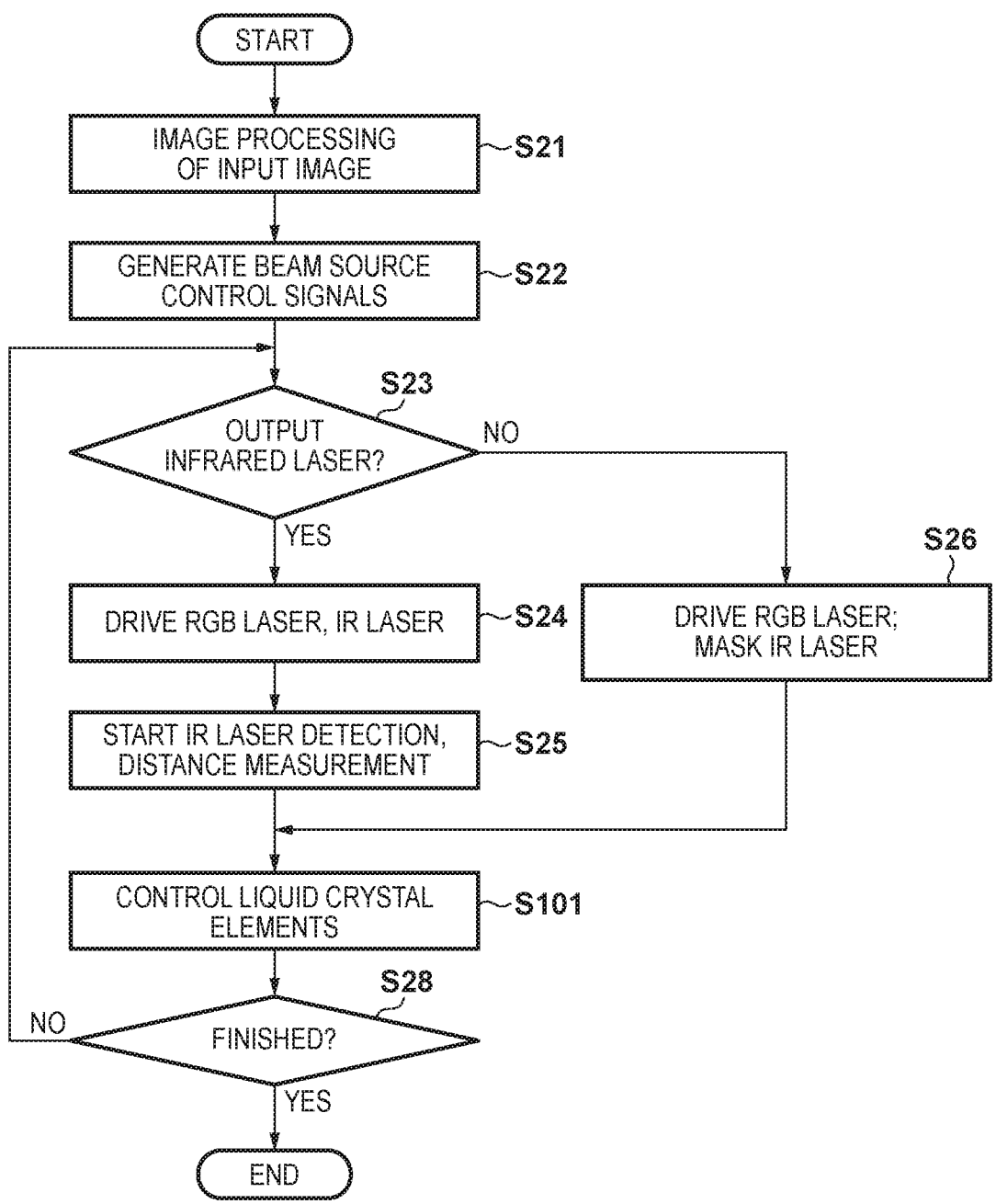
FIG. 10 is a flowchart related to projection processing according to the third embodiment.

Next, a sequence of operations pertaining to projection processing for an input image in the present embodiment will be described with reference to FIG. 10. Note that the present processing is realized as the control unit 101 controls each component of the projector 900 by reading programs stored in a nonvolatile memory of the memory 116 into a system area of the memory 116 and executing the programs, or realized by being executed by the control unit 101 itself.

First, similarly to the above-described first embodiment, the control unit 101 and the like execute the processing of steps S21 to S26. Thereafter, in step S101, the liquid crystal control unit 903 adjusts the transmittances of the liquid crystal elements 904 to 906 based on the image signal, and an image is projected by the control unit 101 controlling the operations of the projection optical system 908.

With reference to FIGS. 11A to 11C, a description is now given of examples of the beam source control signals generated by the laser control unit 901 of the projector 900. FIG. 11A shows an example of a reference timing signal for generating driving waveform patterns. The reference timing signal is, for example, a vertical synchronization signal 1101 included in the image signal. FIG. 11B shows an example of a driving waveform pattern 1102 of the red, green, and blue lasers, and FIG. 11C shows an example of a driving waveform pattern 1103 of the infrared laser. In each of these examples, a period in which the driving waveform pattern is High is a period in which the laser beam is output. As shown in FIGS. 11A to 11C, in each frame period, the infrared laser beam is output in a period that is different from a period in which the red, green, and blue laser beams are output.

In the present embodiment, a period in which the driving waveform pattern 1102 is High represents a vertical effective period of the image signal in FIG. 11B, whereas a period in which the driving waveform pattern 1103 is High represents a vertical ineffective period of the image signal in FIG. 11C. That is, in the vertical effective period of FIG. 11B, the liquid crystal control unit 903 controls a voltage applied to the liquid crystal elements 904 to 906 based on the image signal processed by the image processing unit 102. On the other hand, in the vertical ineffective period of FIG. 11C, the applied voltage is controlled so that the transmittances of predetermined pixels which are preregistered with, for example, the memory 116 and which transmit the infrared laser beam are set at the maximum value, whereas the transmittances of other pixels are set at the minimum value. An IR detection unit 114 calculates a distance to the projection surface by detecting the infrared laser beam that has been transmitted through the liquid crystal element and reflected by the projection surface.

Note that a method of determining the transmittance of the liquid crystal element in the period of FIG. 11C is not limited to the one described above. For example, the liquid crystal control unit 903 may uniformly set the transmittances of all pixels at the maximum value when an individual liquid crystal element is provided for the infrared laser beam source, or the control unit 101 may select the transmittances on a per-frame basis based on a predetermined algorithm.

As described above, by using the driving waveform pattern 1102 shown in FIG. 11B, the emission for a red pixel, a green pixel, and a blue pixel can be started at the same timing and completed at the same timing. That is, an image can be projected while inhibiting red, green, and blue from being temporally separated when viewed (color breaking), which is caused by a difference in these emission timings. In addition, by using the driving waveform patterns 1102 and 1103 shown in FIGS. 11B and 11C, the infrared laser beam can be projected during the vertical ineffective period, and the projection of the red, green, and blue laser beams and the projection of the infrared laser beam can be performed in different periods. As a result, the output of the red, green, and blue laser beams, as well as the luminance of the projected image, can be increased compared to a case where the red, green, and blue laser beams and the infrared laser beam are projected simultaneously during the effective period.

After step S27, the control unit 101 executes the processing of step S28 similarly to the first embodiment, and ends the sequence of operations pertaining to the projection processing for the input image.

According to the examples shown in FIGS. 11A to 11C described above, the red, green, and blue laser beams are projected during the vertical effective period, whereas the infrared laser beam is projected during the vertical ineffective period. However, no limitation is intended by this, as long as the configuration projects the red, green, and blue laser beams and the infrared laser beam in different periods. For example, in order to simplify the control, the driving waveform patterns may be generated so as to switch between laser beams to be projected on a per-field basis or on a per-frame basis. FIGS. 12A to 12C show an example of switching between laser beams to be projected on a per-frame basis. For example, FIG. 12A shows a reference timing signal, which is the vertical synchronization signal 1101 included in the image signal. According to driving waveform patterns 1201 and 1202 shown in FIGS. 12B and 12C, the red, green, and blue laser beams and the infrared laser beam are projected in an alternating fashion on a per-frame basis. The liquid crystal control unit 903 controls the transmittances for the pixels of the liquid crystal elements 904 to 906 in accordance with these driving waveform patterns.

Furthermore, although the present embodiment has been described using an example of a projection apparatus in which the IR detection unit 114 detects reflection of the projected infrared light and the distance calculator 115 calculates the distance to the reflective surface, no limitation is intended by this. For example, a projection apparatus that does not include the IR detection unit 114 and the distance calculator 115 may be configured to project infrared light corresponding to an input image onto a projection surface, and project a predetermined pattern image onto the projection surface.

As described above, in the present embodiment, in the configuration that projects a projection image onto the projection surface by causing the visible laser beams and the invisible laser beam to be transmitted through the liquid crystal elements, the visible laser beams and the invisible laser beams that exceed a reference in total are projected in different periods. Furthermore, at this time, the visible laser beams are projected during the same period. As a result, the output of the visible laser beams, as well as the luminance of the projected image, can be increased compared to a case where the visible laser beams and the invisible laser beams are projected simultaneously. In other words, a reduction in the luminance of the projected image can be suppressed while suppressing a reduction in the image quality attributed to misregistration with respect to an apparatus that emits visible and invisible laser beams.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-146199, filed Aug. 2, 2018 which is hereby incorporated by reference herein in its entirety.

What is claimed is:

1. A projection apparatus comprising:
   a first laser beam source;
   a third laser beam source;
   a fourth laser beam source, wherein the first, third, and fourth laser beam sources are configured to output respective visible laser beams having different colors from one another;
   a second laser beam source configured to output an invisible laser beam;
   a projection unit configured to project an image on a projection surface using the visible laser beam output from the first laser beam source and to project the invisible laser beam output from the second laser beam source to the projection surface; and
   a control unit configured to control a timing at which the first, third, and fourth laser beam sources output the visible laser beams and a timing at which the second laser beam source outputs the invisible laser beam so that the visible laser beams are output in a first period and the invisible laser beam is output in a second period different from the first period,
   wherein the first period and the second period do not overlap with each other and the second period is between adjacent first periods.

2. The projection apparatus according to claim 1, further comprising:
   a detection unit configured to detect a reflected beam of the invisible laser beam; and
   a distance calculator that calculates a distance between the projection apparatus and an object irradiated by the invisible laser beam based on an output timing of the invisible laser beam and a detection timing of the reflected beam.

3. The projection apparatus according to claim 2,
   wherein in a case where the distance calculated by the distance calculator is equal to or shorter than a predetermined threshold, the control unit controls the number of times the invisible laser beam is output to be smaller than the number of times the visible laser beam is output in projecting the image.

4. The projection apparatus according to claim 1,
   wherein the projection unit projects the image by scanning the visible laser beam on the projection surface two-dimensionally.

5. The projection apparatus according to claim 4,
   wherein the control unit determines the first period and the second period so that the first period and the second period are included within a scanning period corresponding to one pixel of the image.

6. The projection apparatus according to claim 1,
   wherein the projection unit projects the image on the projection surface by modulating the visible laser beam using a liquid crystal element based on an input image.

7. The projection apparatus according to claim 4, wherein the control unit controls the first laser beam source and the second laser beam source so that positions on the projection surface to which the visible laser beam and the invisible laser beam are projected are not overlapped.

8. The projection apparatus according to claim 1,
   wherein the control unit controls an output timing of the second laser beam source so that the invisible laser beam is output every predetermined number of frames of an input image.

9. The projection apparatus according to claim 4, wherein the control unit controls the first laser beam source and the second laser beam source so that the visible laser beam and the invisible laser beam are not projected on the same position at once.

10. The projection apparatus according to claim 1,
    wherein the control unit controls output timings so that the invisible laser beam is output only during a period in which a dark image generated by reducing pixel values of an input image is projected, and the invisible laser beam is not output in a period in which a bright image generated by increasing pixel values of an input image is projected.

11. A control method of a projection apparatus which includes a first laser beam source, a third laser beam source, and a fourth laser beam source, wherein the first, third, and fourth laser beam sources are configured to output respective visible laser beams having different colors from one another, a second laser beam source configured to output an invisible laser beam, and a projection unit configured to project an image on a projection surface using the visible laser beam output from the first laser beam source and to project the invisible laser beam output from the second laser beam source to the projection surface, the method comprising:
    controlling a timing at which the first, third, and fourth laser beam sources output the visible laser beams and a timing at which the second laser beam source outputs the invisible laser beam so that the visible laser beams are output in a first period and the invisible laser beam is output in a second period different from the first period,
    wherein the first period and the second period do not overlap with each other and the second period is between adjacent first periods.

12. The control method according to claim 11, further comprising:
    detecting a reflected beam of the invisible laser beam; and
    calculating a distance between the projection apparatus and an object irradiated by the invisible laser beam based on an output timing of the invisible laser beam and a detection timing of the reflected beam.

13. The control method according to claim 12,
    wherein in a case where the distance calculated in the calculating is equal to or shorter than a predetermined threshold, the controlling comprises controlling the number of times the invisible laser beam is output to be smaller than the number of times the visible laser beam is output in projecting the image.

14. The control method according to claim 11,
    wherein the projection unit projects the image by scanning the visible laser beam on the projection surface two-dimensionally.

15. The control method according to claim 14,
    wherein the controlling comprising:
    determining the first period and the second period so that the first period and the second period are included within a scanning period corresponding to one pixel of the image.

16. The control method according to claim 11,
    wherein the projection unit projects the image on the projection surface by modulating the visible laser beam using a liquid crystal element based on an input image.

17. The control method according to claim 11,
    wherein in the controlling, controlling an output timing of the second laser beam source so that the invisible laser beam is output every predetermined number of frames of an input image.

18. The control method according to claim 11,
wherein the controlling comprising controlling output timings so that the invisible laser beam is output only during a period in which a dark image generated by reducing pixel values of an input image is projected, and the invisible laser beam is not output in a period in which a bright image generated by increasing pixel values of an input image is projected.

19. The control method according to claim 11, wherein the controlling comprises controlling the first laser beam source and the second laser beam source so that positions on the projection surface to which the visible laser beam and the invisible laser beam are projected are not overlapped.

20. The control method according to claim 11, wherein the controlling comprises controlling the first laser beam source and the second laser beam source so that the visible laser beam and the invisible laser beam are not projected on the same position at once.

21. A non-transitory computer-readable storage medium storing a program for causing a computer to execute a control method of a projection apparatus which includes a first laser beam source, a third laser beam source, and a fourth laser beam source, wherein the first, third, and fourth laser beam sources are configured to output a respective visible laser beams having different colors from one another, a second laser beam source configured to output an invisible laser beam, and a projection unit configured to project an image on a projection surface using the visible laser beam output from the first laser beam source and to project the invisible laser beam output from the second laser beam source to the projection surface, the method comprising:
   controlling a timing at which the first, third, and fourth laser beam sources output the visible laser beams and a timing at which the second laser beam source outputs the invisible laser beam so that the visible laser beams are output in a first period and the invisible laser beam is output in a second period different from the first period,
   wherein the first period and the second period do not overlap with each other and the second period is between adjacent first periods.

* * * * *